Patented Feb. 28, 1933

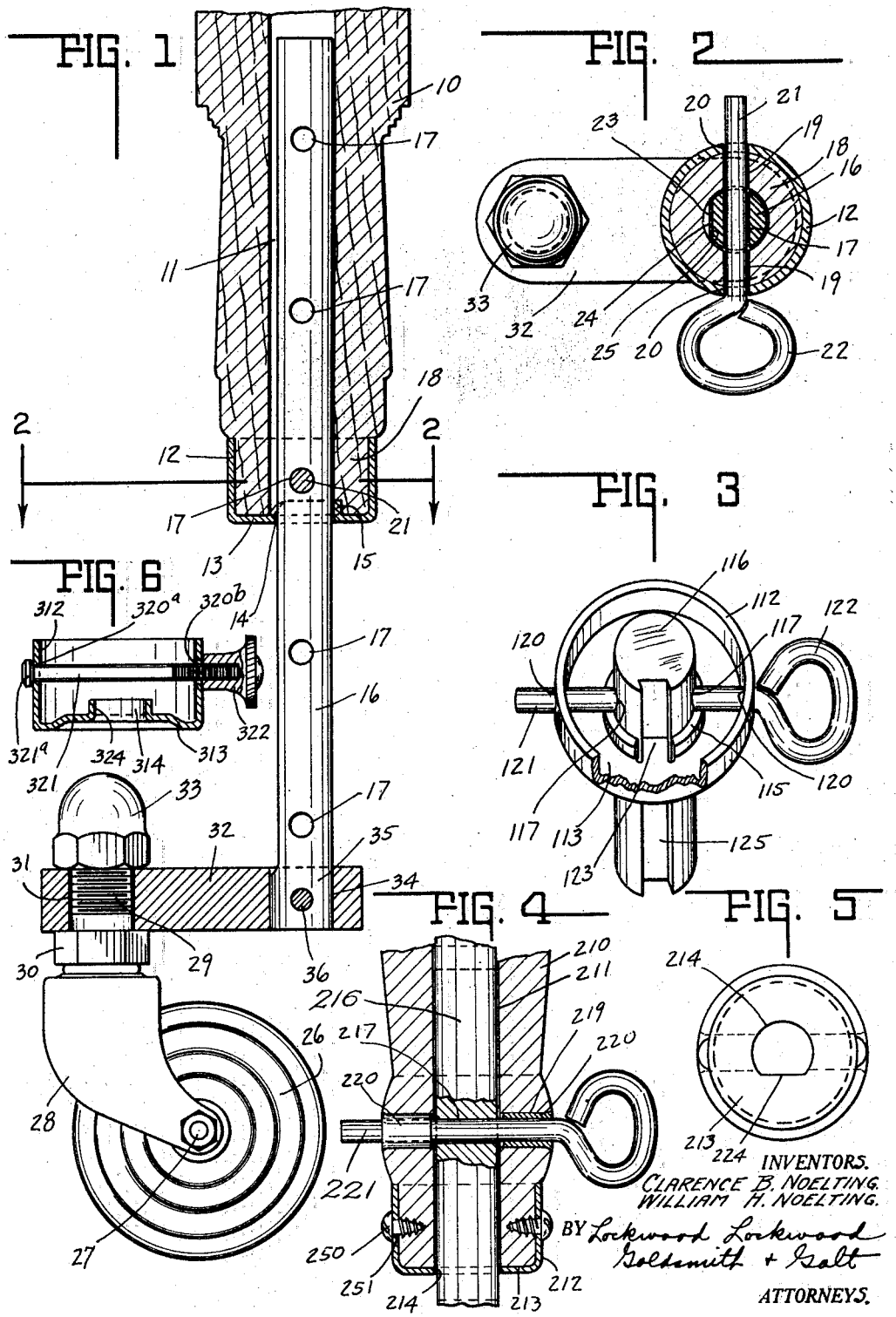

1,899,394

UNITED STATES PATENT OFFICE

CLARENCE B. NOELTING AND WILLIAM H. NOELTING, OF EVANSVILLE, INDIANA, ASSIGNORS TO FAULTLESS CASTER COMPANY, OF EVANSVILLE, INDIANA, A CORPORATION

EXTENSIBLE OFFSET CASTER CONSTRUCTION

Application filed August 17, 1931. Serial No. 557,462.

This invention relates to an extensible, offset caster construction.

The chief object of the invention is to provide an improved extensible offset caster construction wherein the several parts are of simple formation and cooperate to maintain the caster in predetermined fixed offset position with reference to the supporting leg although arranged for longitudinal adjustment.

The chief feature of the invention consists in providing a leg mount for a leg and telescopically associating therewith a caster support member, the same being arranged to readily receive a retaining member, the mount and member cooperating for the purpose set forth.

The full nature of the invention will be understood from the accompanying drawings and the following description and claims:

In the drawing, Figure 1 is a central sectional view through a tubular leg construction provided with the offset extensible caster, certain parts being shown in elevation. Figure 2 is a transverse sectional view taken on the line 2—2 and in the direction of the arrows. Figure 3 is a perspective view of a modified form of leg mount and telescoping caster support member, a portion of the leg mount being broken away to show other portions in detail.

Fig. 4 is a central section through a modified form of the invention.

Fig. 5 is a bottom plan view of the invention shown in Fig. 4.

Fig. 6 is a central sectional view through a modified form of cup and pin construction.

In the drawing, 10 indicates a tubular leg, herein shown of wood and including a longitudinal bore or opening 11 that extends from the lower end of the leg a suitable distance up into the same. Suitably mounted upon the lower end of the leg and enveloping the same is a leg mount having a leg-enveloping body portion 12 and the plate portion 13. Said leg mount may be suitably secured to said leg in any manner well known in the art for securing or attaching leg mounts to legs. This may be by lateral screws or pins or by longitudinal screws or by a friction fit, all of which have been employed for a similar purpose.

The plate 13 of the leg mount includes an aperture 14 that registers with the longitudinal bore 11 of the leg and extending upwardly within the leg mount and defining said aperture is a collar portion 15 which assists in aligning or forming a confining bearing for the caster support member, herein shown in the form of a bar or rod 16 which is telescopically mounted within the leg bore 11. To position the bed or the like, at various elevations from the floor, the support member 16 is provided with a plurality of spaced and lateral openings 17.

Referring specifically to Figure 2, it will be observed that the lower portion 18 of the leg is enveloped by the body portion 12 of the leg mount and that said portion 18 is provided with aligned transverse apertures 19 and the leg mount body is similarly provided with registering apertures 20 and the apertures 19 and 20 register. A securing member is herein shown in the form of a pin 21 which is seatable in the registrable transverse apertures 20 and 19 in the leg mount and leg respectively and also passes through one of the openings 17 of the caster support member or bar 16. One end of the pin is suitably fashioned as indicated at 22 for manual insertion and retraction of the pin. Positioning the pin 21 in the selected opening 17 of the bar 16 secures the desired extensible adjustment.

For maintaining alignment to secure ready registration of the selected aperture 17 with the aligned apertures 19 and 20, suitable means is provided to prevent rotation of the bar in the opening 11. The bar may be of any desired cross-sectional outline but the bore 11, it has been determined in manufacturing, is most readily and cheaply formed as a cylindrical opening. In Figures 1 and 2, the collar 15 is arranged in slightly offset or inwardly projecting relation, as indicated at 23, and the same includes a flat face 24 which bears against a flat surface 25 formed upon the bar 16 and the said flat surface 25 extends substantially throughout the length of the bar except that it may terminate short of the bottom end as illustrated in Figure 1. As a result of the foregoing construction, there is mutual cooperation between the bar and the leg mount so that the bar does not rotate in the opening 11 and, therefore, all of the transverse apertures 17, 19 and 20 always lie in substantially the same plane. Therefore, the only locating adjustment for pin insertion is a longitudinal adjustment, since, in the telescopic movement of the bar, each of the openings 17 successively register with the aligned transverse apertures 19 and 20.

In the lower portion of Figure 1 there is illustrated a caster wheel 26 mounted upon the axle 27 carried by the ears 28 of the yoke which is swivelly mounted in the socket member 29. The socket member 29 is herein shown threaded and includes a laterally-directed bottom flange 30 which has an exterior portion arranged for tool engagement, such as a wrench or the like, and herein such peripheral outline is hexagonal. The exteriorly threaded socket-forming member 29 projects through the opening 31 formed in one end of an offset member 32 and the projecting upper end mounts a suitable cap nut 33. The opening 31 may be circular and, when circular, a wrench holding the socket through engagement with the portion 30 and another wrench engaging the cap nut 33 serves to rigidly mount the socket in and upon the offsetting bar or plate 32.

Plate 32, in the other end as at 34, receives the lower end 35 of the bar 16 and herein the same have a relatively fixed relationship and are rigidly secured together in such fixed relationship by the pin 36 which may be of tapered character and relatively permanently secured thereto. Since the vertical bar 16 is prevented from rotating in the leg and since the offset bar 32 has a fixed relation thereto, it will be apparent that the axis of the socket will be offset from the axis of the leg and in a fixed relation so that for hospital beds and the like, where extensibility is highly desirable, said offsetting permits the caster itself to be positioned within the projected area of the bed so that the offset caster does not project beyond the offset area when in use and thus will not be the cause of tripping the nurses and others moving about the bed.

In Figure 3 a modified form of the invention is illustrated which is substantially similar to that previously set forth and, in this form of the invention, similar parts bear numerals of the one hundred series. The bar is indicated by the numeral 116; the body of leg mount by the numeral 112; the pin by the numeral 121, the gripping portion by the numeral 122, the plate of the leg mount by the numeral 113; the collar by the numeral 115 and herein it is provided with an inwardly-directed tongue 123 which rides in a longitudinal groove or keyway 125 formed in the bar 116. Functionally, this form of the invention is the full equivalent of that shown in Figure 2.

In Figs. 4 and 5 a further modified form of the invention is illustrated. In these figures, 210 indicates the leg, 216 the bar or rod in the bore 211. The leg above the cup is laterally apertured as at 219 and mounted therein are bushings 220 which receive the pin 221 that also passes through opening 217 in the bar. The cup 212 includes the bottom 213 having the aperture 214 therein, said aperture having the inwardly directed tongue or flatted portion 224. The cup is secured to the leg by suitable means extending laterally, or, if desired, longitudinally into the leg. Herein lateral screws 250 are illustrated extending through cup apertures 251.

In Fig. 6 the cup includes the inwardly and upwardly dished base 313 having the central opening defined by the circular wall 314 which is flattened at 324 for the purpose set forth. The cup includes side wall 312 with aligned apertures 320a and 320b the latter being larger than the former. The pin 321 includes a head 321a and the threaded opposite end mounts ornamental nut 322.

The invention claimed is:

1. In combination, a tubular leg, a leg mounted on the lower end thereof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, and a pin retainer positioned in the body and leg apertures and in one of the member apertures for adjustably mounting the leg and member.

2. In combination, a tubular leg, a leg mount on the lower end thereof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, a pin retainer positioned in the body and leg apertures and in one of the member apertures for adjustably mounting the leg and member, said leg mount and said member having cooperative portions preventing relative rotation of the member in the leg mount, and an offset caster carried by the leg-exposed end of the member and in predetermined fixed offset position relative to the leg.

3. In combination, a tubular leg, a leg mount on the lower end thereof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, a pin retainer positioned in the body and leg apertures and in one of the member apertures for adjustably mounting the leg and member, said leg mount and said member having co-operative portions preventing relative rotation of the member in the leg mount, an offset caster carried by the leg-exposed end of the member and in predetermined fixed offset position relative to the leg, said offset caster including a swivelling caster, and a transverse support rigidly secured at one end to the leg-exposed end of the member and its opposite end supporting said caster.

4. In combination, a tubular leg, a leg mount upon the lower end therof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, and a pin retainer positioned in the body and leg apertures and in one of the member apertures for adjustably mounting the leg and member, said leg mount having a wall defining its first-mentioned aperture and a portion extending inwardly, said extension member including a longitudinal portion cooperating therewith for preventing rotation of the extension member in the hollow leg.

5. In combination, a tubular leg, a leg mount upon the lower end thereof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, a pin retainer positioned in the body and leg apertures and in one of the member apertures for adjustably mounting the leg and member, said leg mount having a wall defining its first-mentioned aperture and a portion extending inwardly, said extension member including a longitudinal portion cooperating therewith for preventing rotation of the extension member in the hollow leg, a caster, and a laterally-positioned member carried by the leg-exposed end of the extension member and supporting said caster in offset relation to said extension member.

6. In combination, a tubular leg, a leg mount upon the lower end thereof and including an upwardly-directed body wall of appreciable height and enveloping the exterior of the leg and a plate portion having an aperture registering with the hollow portion of the leg, an extension member slidably mounted in the hollow of the leg, said member including a plurality of spaced transverse apertures therethrough, said body and body-enclosed portion of the leg including registering transverse apertures extending entirely across the same, a pin retainer positioned in the body and leg apertures and in one of the member apertures for adjustably mounting the leg and member, said leg mount and said member having a cooperating connection permitting relative longitudinal movement and preventing relative rotative movement therebetween for aperture-locating purposes.

In witness whereof, we have hereunto affixed our signatures.

CLARENCE B. NOELTING.
WILLIAM H. NOELTING.